United States Patent
Lewallen et al.

(10) Patent No.: US 8,047,728 B2
(45) Date of Patent: Nov. 1, 2011

(54) OPTICAL FIBER CONNECTOR WITH ENHANCED BONDING CAPABILITY AND METHOD OF ASSEMBLING FIBER

(75) Inventors: Christopher Paul Lewallen, Hudson, NC (US); James Phillip Luther, Hickory, NC (US); Hieu Vinh Tran, Charlotte, NC (US)

(73) Assignee: Corning Cable Systems LLC, Hickory, NC (US)

( * ) Notice: Subject to any disclaimer, the term of this patent is extended or adjusted under 35 U.S.C. 154(b) by 559 days.

(21) Appl. No.: 12/228,450

(22) Filed: Aug. 13, 2008

(65) Prior Publication Data
US 2010/0040333 A1    Feb. 18, 2010

(51) Int. Cl.
*G02B 6/36* (2006.01)
*G02B 6/38* (2006.01)

(52) U.S. Cl. .......... 385/80; 385/72; 385/78; 385/88; 385/91

(58) Field of Classification Search .......... 385/80
See application file for complete search history.

(56) References Cited

U.S. PATENT DOCUMENTS

| 5,748,819 A * | 5/1998 | Szentesi et al. | 385/60 |
| 2005/0124168 A1 * | 6/2005 | Nagahara et al. | 438/745 |

\* cited by examiner

*Primary Examiner* — Uyen Chau N Le
*Assistant Examiner* — Kajli Prince

(57) ABSTRACT

A method of assembling an optical fiber connector includes the steps of providing a ferrule with an internal through passage, and using a gas for treating a surface of the internal through passage to enhance a bonding capability of the surface. Adhesive is introduced into at least a portion of the internal through passage and at least one optical fiber is secured to the surface of the internal through passage by the adhesive. Another method includes the steps of providing the ferrule with an internal through passage including a shoulder, a window that extends through a side surface, and a cap having at least a portion inserted into the window. Adhesive is introduced into at least a portion of the internal through passage and is in engagement with the shoulder for providing an axial stop for securing at least one optical fiber with respect to the internal through passage.

11 Claims, 13 Drawing Sheets

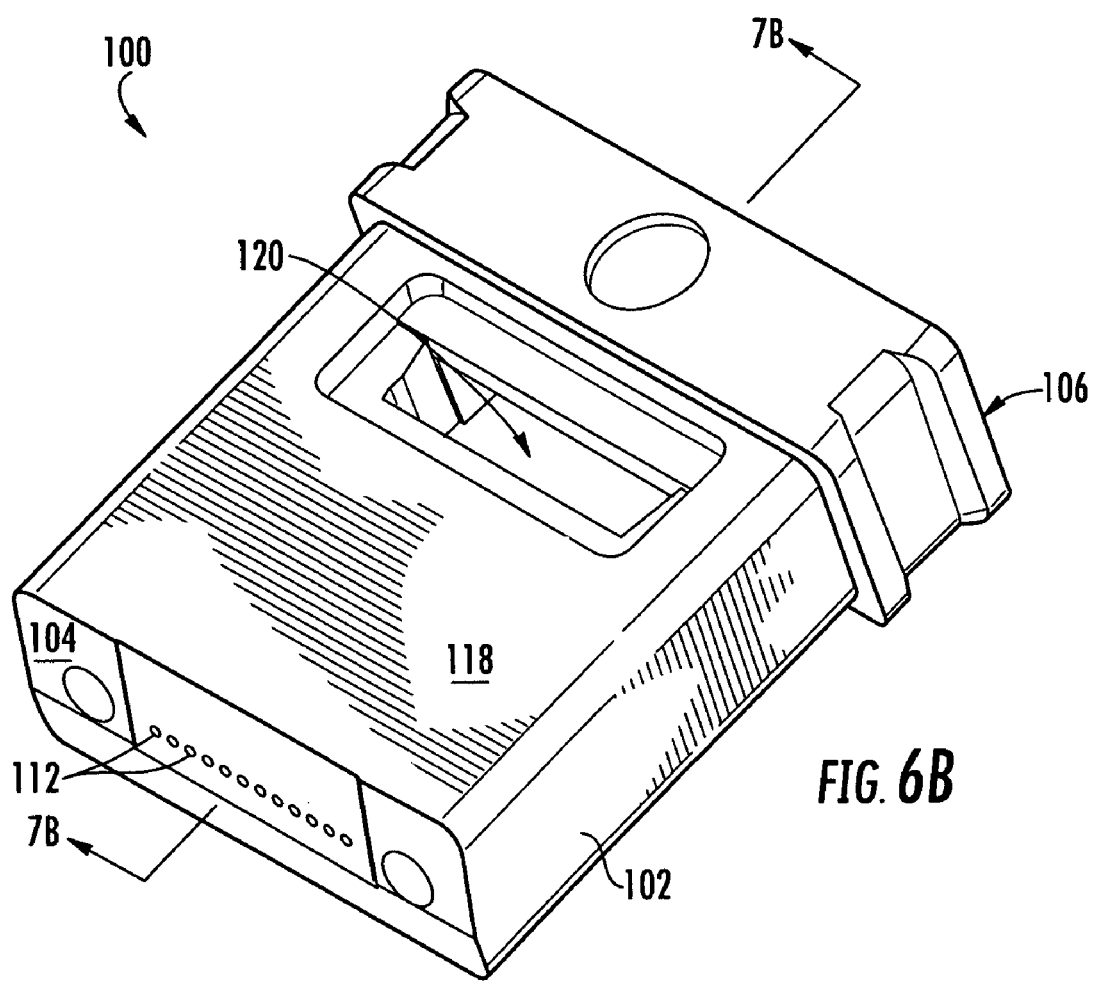

OPTICAL FIBER CONNECTOR WITH ENHANCED BONDING CAPABILITY AND METHOD OF ASSEMBLING FIBER

TECHNICAL FIELD

The present invention relates generally to a method of assembling an optical fiber connector, and more particularly, to a method of assembling an optical fiber connector with enhanced bonding capability.

BACKGROUND

In the process of connectorizing optical fibers, a conventional ferrule is typically mounted upon the end portions of one or more optical fibers. Thereafter, the other components of the fiber optic connector assembly, such as the spring, the connector housing, the crimp body, and the crimp band, can be assembled. Although the ferrule is principally disposed within an internal cavity defined by the connector assembly housing, the front portion of the ferrule protrudes beyond the connector assembly housing or is otherwise exposed. Consequently, the end portions of the optical fibers that extend through the optical fiber bores defined by the ferrule and that typically protrude slightly beyond the front surface of the ferrule are also exposed following assembly of the fiber optic connector assembly. By mating a pair of fiber optic connector assemblies such that the front surfaces of the ferrules are either brought into contact or are at least disposed proximate one another, the end portions of the optical fibers upon which the fiber optic connector assemblies are mounted will generally be aligned such that optical signals can pass therebetween with a minimum of attenuation.

Initially, single fiber ferrules were developed for mounting upon individual optical fibers. These single fiber ferrules typically have a cylindrical shape and define a single optical fiber bore extending lengthwise therethrough. In order to mount the single fiber ferrule upon an optical fiber, an adhesive is introduced into the optical fiber bore defined by the single fiber ferrule and the optical fiber subsequently inserted into the optical fiber bore. Once the adhesive has cured, the single fiber ferrule is securely mounted upon the end portion of the optical fiber.

While single fiber ferrules are extremely useful and commonly utilized in a variety of applications, a growing number of applications demand the optical interconnection of a plurality of optical fibers. As such, multifiber connectors have been developed that include multifiber ferrules for mounting upon the end portions of a plurality of optical fibers to facilitate the interconnection of a plurality of optical fibers. Additionally, a number of applications require that the ferrule have a substantially rectangular shape in lateral cross-section. Like a cylindrical ferrule, a generally rectangular multifiber ferrule defines a plurality of optical fiber bores through which the optical fibers extend. Unlike a cylindrical ferrule, however, adhesive may not initially be introduced into the optical fiber bores prior to inserting the optical fibers therethrough. Instead, the generally rectangular multifiber ferrule can define a window through which at least a medial portion of the optical fiber bores is exposed. As such, the end portions of the optical fibers can first be inserted through the optical fiber bores and adhesive can then be introduced through the window defined by the multifiber ferrule so as to secure the end portions of the optical fibers within the multifiber ferrule once the adhesive has cured.

In many instances, as part of a fiber assembling process, it would be desirable to preassemble at least portions of a fiber optic connector assembly. In this regard, the various components of a multifiber connector assembly could be preassembled prior to mounting the fiber optic connector and, in particular, the multifiber ferrule upon the end portions of a plurality of optical fibers. As such, the multifiber connector could be preassembled in a factory setting and then shipped to the field.

While a variety of fiber optic connectors including various ferrules have been developed, the need still exists for improved multifiber connectors and improved methods for assembling a multifiber connector. More specifically, a need exists for improved optical fiber connectors with an enhanced bonding capability to inhibit or prevent the removal of the optical fibers from the connector once assembled together.

SUMMARY

In one example aspect, a method of assembling an optical fiber connector includes the step of providing a ferrule including a first end, a second end, and an internal through passage extending between the first end and the second end. The method further includes the step of using a gas for treating a surface of the internal through passage to enhance a bonding capability of the surface. The method further includes the steps of introducing an adhesive into at least a portion of the internal through passage, and inserting at least one optical fiber through the internal through passage. The at least one optical fiber is secured to the surface of the internal through passage by the adhesive.

In another example aspect, a method of assembling an optical fiber connector includes the step of providing a ferrule including a first end, a second end, and an internal through passage. The internal through passage includes at least one optical fiber bore that opens through the first end and an internal cavity that opens through the second end, wherein the at least one fiber bore is in fluid communication with the internal cavity. The method also includes the steps of loading the ferrule into a processing chamber including a gas, and enhancing a bonding capability of a surface defining the internal through passage by transmitting a predetermined amount of energy into the processing chamber to react with the gas. The method further includes the steps of introducing an adhesive within at least a portion of the internal through passage, and inserting at least one optical fiber through the internal cavity and into the at least one optical fiber bore. The at least one optical fiber is secured to the surface of the internal through passage by the adhesive.

In yet another example aspect, a method of assembling an optical fiber connector includes the step of providing a ferrule including a first end, a second end, a side surface, and an internal through passage extending between the first end and the second end. The method also includes the step of providing a window that extends through the side surface, wherein the window is in fluid communication with the internal through passage. The method also includes the steps of providing the internal through passage with a shoulder, and providing a cap. The method further includes the steps of inserting at least a portion of the cap into the window, introducing an adhesive into at least a portion of the internal through passage and in engagement with the shoulder, and inserting at least one optical fiber through the internal through passage. The at least one optical fiber is secured with respect to the internal through passage by the adhesive with an interaction between the adhesive and the shoulder providing an axial stop in a direction from the first end to the second end while the portion of the cap is inserted into the window. In still yet another example aspect, an optical fiber connector includes a ferrule including a first end, a second end, a side surface, and an internal through passage extending between the first end and the second end. The internal through passage includes a shoulder. A window extends through the side surface of the ferrule, and the window is in fluid communication with the internal through passage. A cap is adapted to have at least a portion inserted into the window, and adhesive is adapted to be introduced into at least a portion of the internal through passage and be in engagement with the shoulder. At least one optical fiber can be inserted through the internal through passage. The at least one optical fiber is secured with respect to the internal through passage by the adhesive with an interaction between the adhesive and the shoulder providing an axial stop in a direction from the first end to the second end while the portion of the cap is inserted into the window.

BRIEF DESCRIPTION OF THE DRAWINGS

These and other features, aspects and advantages of the present invention are better understood when the following detailed description of the invention is read with reference to the accompanying drawings, in which:

FIG. 6B illustrates the ferrule in FIG. 6A without the inserted fibers, the adhesive and the cap;

DETAILED DESCRIPTION

Figure 1:
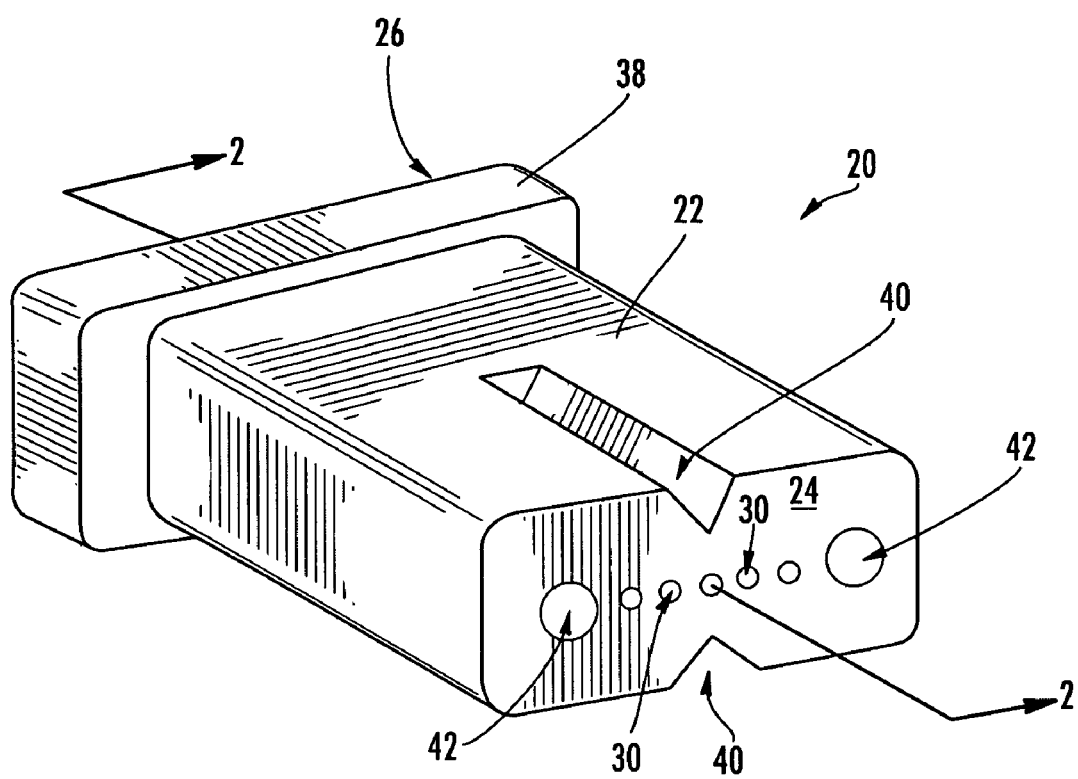
FIG. 1 illustrates a perspective view of an example multifiber ferrule for use with the example assembly method described herein.

The present invention will now be described more fully hereinafter with reference to the accompanying drawings in which example embodiments of the invention are shown. Whenever possible, the same reference numerals are used throughout the drawings to refer to the same or like parts. However, this invention may be embodied in many different forms and should not be construed as limited to the embodiments set forth herein. These example embodiments are provided so that this disclosure will be both thorough and complete, and will fully convey the scope of the invention to those skilled in the art.

Referring now to FIG. 1, an optical fiber connector 20 is shown for use with the present invention. The optical fiber connector 20, as will be described more fully herein, can be efficiently assembled manually or even automatically in a factory setting prior to being finally assembled into a complete optical cable assembly (not shown) for use in the field. As will be understood by one of skill in the art, the optical cable assembly can include various components, such as a housing, crimp body, spring, lead-in tube, boot, etc. though more or less other components can also be included.

The optical fiber connector 20 can include a ferrule 22 having a first end 24, a second end 26, and an internal through passage 28 (see FIGS. 2 and 3) extending between the first and second ends 24, 26. The internal through passage 28 can include one or more passages having various geometries that extend through the ferrule 22. Accordingly, the ferrule 22 can be single fiber ferrule (not shown) having a single optical fiber bore capable of supporting only a single optical fiber. Alternatively, as shown, the ferrule 22 can be a multifiber ferrule having a plurality of optical fiber bores 30 capable of supporting a plurality of optical fibers within the ferrule 22 (see FIG. 7). Each optical fiber bore 30 can be configured to receive a single optical fiber, though alternatively the optical fiber bores 30 can also be configured to receive multiple optical fibers.

Figure 2:
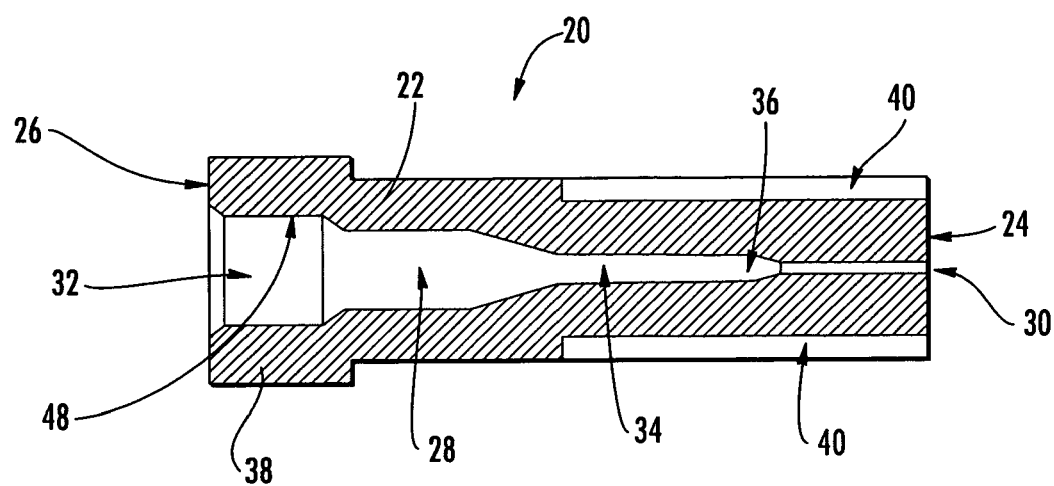
FIG. 2 illustrates a sectional view taken along line 2-2 of FIG. 1.

As shown in FIG. 2, the internal through passage 28 can extend through the ferrule 22 between the first and second ends 24, 26. For example, the internal through passage 28 can include the plurality of optical fiber bores 30 that open through the first end 24 of the ferrule 22. In addition or alternatively, the internal through passage 28 can also include an internal cavity 32 that opens through the second end 26 of the ferrule 22. Thus, the plurality of optical fiber bores 30 can be in fluid communication with the internal cavity 32 such that one or more optical fibers can extend through the internal cavity 32 and into the optical fiber bores 30. It is to be appreciated that the internal through passage 28 can have various geometries and/or sizes along its length. For example, as shown in FIG. 2, the internal through passage 28 can have a relatively larger cross-sectional dimension proximate the second end 26, and a relatively smaller cross-sectional dimension proximate optical fiber bores 30. In addition or alternatively, the internal through passage 28 can include one or more intermediate portions 34 that are connected to the optical fiber bores 30 by way of one or more tapered transition portions 36. The intermediate portions 34 and/or the transition portions 36 can facilitate manufacture of the ferrule 22, such as during a forming or molding operation, and/or can facilitate insertion of an optical fiber through the ferrule 22. For example, where an optical fiber is inserted into the ferrule 22 by way of the second end 26 and towards the first end 24, the tapered transition portions 36 can guide the optical fiber and/or inhibit binding (i.e., hindering or restraining insertion of the optical fibers due to contact of the optical fibers with portions of the internal through passage, which may cause fiber buckling, bending, etc.) or the like. In other words, the internal through passage 28 can include any or all of the optical fiber bores 30, the internal cavity 32, the intermediate portion(s) 34, and the transition portion 36. Still, it is to be appreciated that internal through passage 28 can include various other geometries, sizes, portions, etc.

The ferrule 22 can also include various other features. In one example, the ferrule 22 can include various materials, such as various thermosetting and/or thermoplastic materials. For example, the ferrule 22 can include polyphenylene sulfide, commonly known as PPS, though other materials can also be used. Moreover, the ferrule 22 can be formed as an assembly of elements, or can even be formed as a monolithic component. In another example, the ferrule 22 can include a shoulder portion 38 that can facilitate handling of the ferrule 22, and/or connection of the ferrule 22 with various other components of a complete optical cable assembly (not shown). The ferrule 22 can also include one or more grooves 40 for facilitating polishing of the front surface of the ferrule 22. In addition or alternatively, the corners of the ferrule 22 can be square, rounded or curved to increase the size of the ferrule shoulder and correspondingly improve the seating of the ferrule 22 within a complete optical cable assembly (not shown). In addition or alternatively, the ferrule 22 can include one or more elongate guide pin holes 42 configured to receive guide pins (not shown) for aligning the ferrule 22 with an opposing ferrule of a mating connector (not shown) in a known manner. It is to be appreciated that the ferrule 22 can also include more or less various other elements or features.

Figure 3:
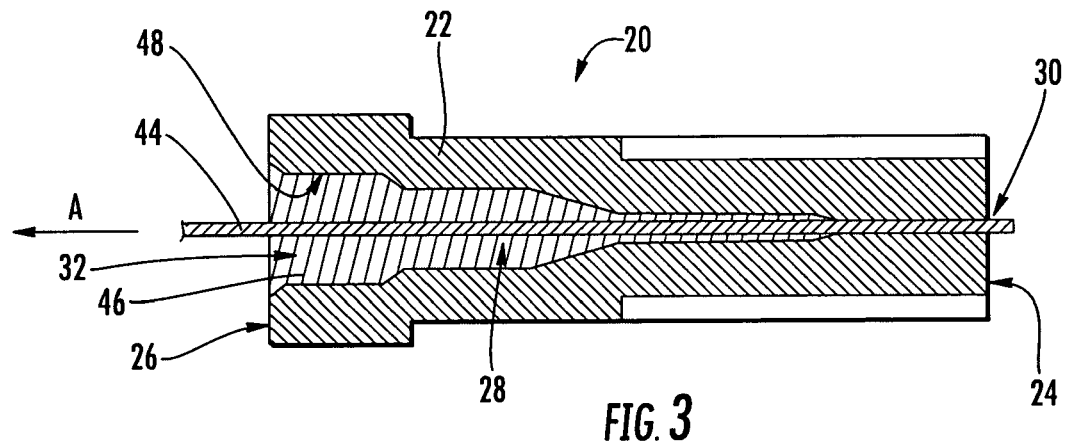
FIG. 3 illustrates the ferrule of FIG. 2, but shows an example optical fiber secured within the example ferrule.

Turning now to the example shown in FIG. 3, an optical fiber 44 is illustrated being secured to the ferrule 22 by an adhesive 46. It is to be appreciated that while only a single optical fiber 44 is illustrated, a plurality of optical fibers 44, such as a group provided in a ribbon cable (e.g., see 110 in FIG. 7), can be secured to the ferrule 22 by the adhesive 46. It can be beneficial to secure the optical fiber(s) 44 with the ferrule 22 to counteract against tensile forces, such as along the direction of arrow A, that may be applied to the optical fiber(s) 44 during use. In the illustrated example, the adhesive 46 can be introduced into at least a portion of the internal through passage 28 in various manners. In one example, the adhesive 46 can be provided via either or both of the first and second ends 24, 26. The adhesive 46 can be provided to the internal through passage 28 in various manners, including being injected, pumped, gravity fed, etc. Moreover, the adhesive 46 can be introduced into less than the full internal volume of the internal through passage 28, or as shown, can be introduced into approximately the entire internal volume of the internal through passage 28. The optical fiber 44 can be inserted into the ferrule 22 prior to, concurrent with, or subsequent to the introduction of the adhesive 46 within the ferrule 22. In the shown example, the optical fiber 44 is inserted into the ferrule 22 by way of the second end 26 after the adhesive 46 is introduced into the internal through passage 28, desirably when the adhesive is still in fluid state prior to complete curing.

Various adhesives can be used. In one example, the adhesive 46 can include an epoxy, such as EP-62 epoxy or Epo-tek 375 epoxy. Still, various other epoxies and/or various other types of adhesives, or even combinations of adhesives, can be used. The various adhesives can also include various curing methods, such as thermosetting, ultraviolet light (UV) curing, etc. As shown in FIG. 3, the adhesive 46 generally encapsulates the optical fiber 44 (which could include, e.g., a fiber core, cladding layer, and an outer protective layer) and is in engagement with an interior surface 48 of the internal through passage 28. Thus, the engagement or bond between the adhesive 46 and the interior surface 48 can inhibit, such as prevent, withdrawal of the optical fiber 44 from the ferrule 22 during various conditions.

The resistance of the optical fiber 44 against tensile forces (e.g., such as along the direction of arrow A or various other directions or angles) is commonly referred to as pullout strength. The pullout strength generally refers to the amount of force required to be applied to the optical fiber 44 to separate the optical fiber 44 from the ferrule 22. Thus, a relatively higher pullout strength generally corresponds to a greater resistance of the optical fiber 44 against tensile forces. Various methods can be used to increase the pullout strength of the optical fibers 44. As will be discussed more fully herein, it can be beneficial to provide the optical fiber connector with enhanced bonding capability for engagement with the adhesive 46.

Enhanced bonding capabilities can be provided in a wide variety of ways. In one example, enhanced bonding capability can be provided by treating or conditioning the interior surface 48 of the internal through passage 28. Surface treatment, for instance, can involve enhancing the surface roughness. For example, the interior surface 48 may be etched or otherwise worked (i.e., using various mechanical, electrical, and/or chemical processes) to increase the surface roughness to enhance bonding of the adhesive 46 to the interior surface 48. In addition or alternatively, surface treatment or conditioning may involve removing various contaminants that may be deposited on the interior surface 48 during manufacturing processes, transportation, assembly, or handling, for example. Contaminants may include dust or other debris, oil, silicone or other contaminating materials. Removing contaminants can allow the adhesive 46 to more effectively bond to the interior surface 48. For example, removing the contaminants promotes enhanced contact between the adhesive 46 and the interior surface 48 of the internal through passage 28. In another example, the contaminants may fill surface irregularities of the interior surface 48. Thus, removing the contaminants can also effectively increase the surface roughness of the internal through passage 28 in further examples.

Examples of the present invention can involve treating or conditioning a portion or substantially the entire interior surface 48 of the internal through passage 28. Although not required, at least portions of the interior surface defining the optical bores 30 may be treated. Due to the relatively small size of the optical fiber bores 30, such as approximately 125 micrometers in diameter (though other diameters are also contemplated), it can be beneficial to have a contaminant removal medium that flows relatively freely through the entirety of the internal through passage 28. Thus, in one example, a gas can be used for treating the interior surface 48 of the internal through passage 28 to enhance the bonding capability of the interior surface 48. That is, the gas can be used to treat the interior surface 48 to enhance the bonding capability of the interior surface 48 with any number of the previously discussed adhesives 46 to increase the pullout strength. While such a treatment system can be utilized with a windowed ferrule, it is to be appreciated that the treatment system can similarly be performed with a windowless ferrule, as shown in FIGS. 1-3, so as to facilitate automated assembly processes.

As can be appreciated, a gas can be capable of relatively unrestricted flow within the internal through passage 28, including the optical fiber bores 30. Various types of gasses can be used, including a single type of gas or even a mixture of various gasses. Moreover, the one or more types of gasses can be used at various conditions (e.g., temperatures, pressures, concentrations, etc.). Additionally, the one or more types of gasses can be utilized in a nominal state, or can be used in an excited state, such as in various chemically or electrically excited states.

Figure 4:
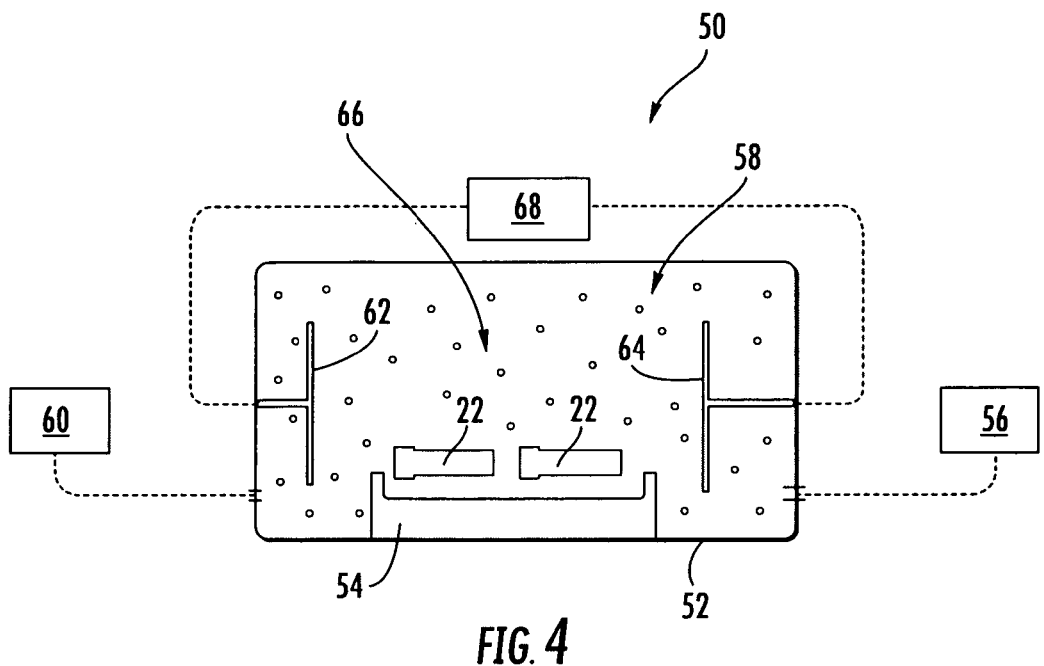
FIG. 4 illustrates a schematic representation of an example method of using a gas for enhancing a bonding capability of the example ferrule of FIG. 1.

In one example, turning to FIG. 4, the gas can be used to generate a plasma (i.e., ionized gas) to perform a plasma etch cleaning process 50 or the like. That is, plasma is generated by radio frequency (RF) or microwave energy excitation of a reactive gas to cause the dielectric breakdown of the gas for sustaining a stable plasma environment. As such, the gas is ionized such that free ions and electrons are created to react with the ferrule 22.

For example, as shown, one or more ferrules 22 can be loaded into a processing chamber 52 or the like. The ferrules 22 can be retained upon a non-electrically-conductive substrate 54, such as a glass or ceramic tray or the like. The ferrules 22 can also be arranged in a pattern or array on the substrate 54, or can be loosely placed upon the substrate 54. It is to be appreciated that where a removable tray is used, the tray may include an optional lid or other element (not shown) configured to inhibit future contamination of the ferrules 22 after the cleaning process. In further examples, the processing chamber 52 can then be sealed, and a vacuum can be formed within the processing chamber 52. A vacuum pump 56 or other device can be used to provide a complete vacuum, a near vacuum, or other pressure-controlled environment. Gas (e.g., atmospheric gasses or even other gasses) can still be present within the processing chamber 52, and/or an additional working gas 58 can be supplied from a gas source 60. In one example, for purposes of the instant plasma etch cleaning process 50, the working gas 58 can be oxygen provided at a relatively low pressure, such as approximately 500 millitorr (i.e., one half torr or approximately 66.67 pascals) or the like. It is to be understood that the treatment or conditioning of the internal through passage 28 can actually be performed by a functional gas that may differ from the originally introduced gas. For example, where oxygen gas is used, the functional gas that performs the treatment or conditioning may be an oxygen plasma, which can differ from the originally introduced oxygen gas ($O_2$). Still, various other reactive gasses can also be used, such as nitrogen, argon, etc., including various combinations of gasses and/or functional gasses, etc.

Next, the plasma can be generated by radio frequency (RF) or microwave energy excitation (i.e., electric fields) of the reactive working gas 58. The RF energy can be supplied to the processing chamber 52 in a controlled and predetermined manner by a radio frequency generator 68 coupled to a pair (or more) of electrically conductive plates 62, 64 that are separated by a gap 66 to provide a high electric potential therebetween. The RF energy can be supplied via the electrically conductive plates 62, 64 at various frequencies and/or power levels. In one example, the RF energy can be supplied at a frequency of approximately 13.56 MHz, which is approved by the F.C.C. (Federal Communications Commission) for use in industrial applications, though other frequencies are also contemplated. The RF electric field can be supplied at a power level of approximately 300 watts, though other power levels, including continuous and varying levels, are also contemplated. Thus, the radio frequency generator 68 can be configured to transmit a predetermined amount of energy into the processing chamber 52 to react with the working gas 58. Additionally, the ferrules 22 can be subjected to the plasma-etch cleaning process for varying amounts of time, such as two minutes, though various other process times can also be used. Moreover, any or all of the steps described herein can be performed in various orders, and can even include more or fewer steps.

The plasma-etch cleaning process can enhance the bonding capability of the interior surface 48 of the ferrule 22 in various manners. In one example, the plasma-etch process can perform an ablation of the interior surface 48 to mechanically clean contaminants from the surface. The oxygen ions and free electrons that are created as a result of the plasma generation act to bombard exposed surfaces of the ferrule 22, the internal surface of the through passage 28, including the interior surface 48 and even the surface of the relatively small optical fiber bores 30. Because many surface contaminant layers are typically formed of weak carbon-hydrogen bonds, the ablation process breaks down these weak bonds until the contaminants can be released into the vacuum of the processing chamber 52. As such, the processing chamber 52 can include fans (not shown) or other elements to permit circulation of the working gas 58 therein to facilitate contaminant removal. Thus, use of the plasma-etch cleaning process can enhance the bonding capability of the interior surface 48 to bond with the adhesive 46 to increase the pullout strength.

In another example, the plasma-etch process can enhance the bonding capability of the interior surface 48 of the ferrule 22 by altering the surface activation energy of the ferrule 22. That is, the generated plasma can chemically replace the surface polymer groups with chemical groups from the plasma gas to thereby alter the chemical activity and characteristics of the interior surface 48. For example, altering the surface activation energy can alter the characteristics of wetting and/or adhesion, yielding enhanced adhesive strength and/or removal resistance. Generally, increased adhesive bonding can occur when the surface activation energy of the interior surface 48 has a closer value to that of the adhesive 46. Thus, use of the plasma-etch cleaning process can alter the surface activation energy of the interior surface 48 to be closer to or even approximately equal to that of the particular adhesive 46 being utilized to increase adhesion, and therefore increase the pullout strength.

In yet another example, the plasma-etch process can enhance the bonding capability of the interior surface 48 of the ferrule 22 by a cross-linking process. During the cross-linking process, chemical links are formed between molecular chains of polymers on the interior surface 48. The chemical links can produce a stronger and/or harder substrate micro-surface for the adhesive 46 to increase the pullout strength.

Although the previously described plasma-etch cleaning process can be used within a pressure-controlled environment, it is to be appreciated that various other plasma-based cleaning processes can be performed in an ambient atmosphere (e.g., a pressure of approximately 760 torr or 101,325 pascals). In one example, the ferrules 22 can be cleaned by way of a corona discharge process. For instance, with reference to FIG. 4, a corona discharge process can be performed by locating the ferrules 22 within the gap 66 between the electrically conductive plates 62, 64, and supplying energy to the plates 62, 64 at various power levels sufficient to ionize the gas located therebetween. Thus, like the plasma-etch process, a predetermined amount of energy can be supplied to react with a working gas to enhance the interior surface 48 of the ferrule 22. However, unlike the use of a RF generator, the generator used in a corona discharge system can apply a generally continuous, direct current (DC) supply of electricity across the plates 62, 64. Moreover, though plates 62, 64 are illustrated, a corona discharge system can similarly utilize relatively sharp electrode tips to generate plasma therebetween. A corona discharge system can also utilize various gasses, and can even be performed in ambient air (e.g., a mixture of nitrogen, oxygen, and various common trace gasses). Still further, the corona discharge process can be performed in controlled environments with controlled gasses or gas mixtures. In further examples, the corona discharge process can be performed in ambient atmosphere with or without a processing chamber. For instance, the corona discharge process may be carried out while the ferrule 22 is supported (e.g., by a non-conductive substrate) between the plates 62, 64. The corona discharge process can similarly act upon the interior surface 48 of the ferrule 22 in any or all of the aforedescribed manners (i.e., ablation, altering surface activation energy, and/or cross-linking) for enhancing the bonding surface.

Figure 5:
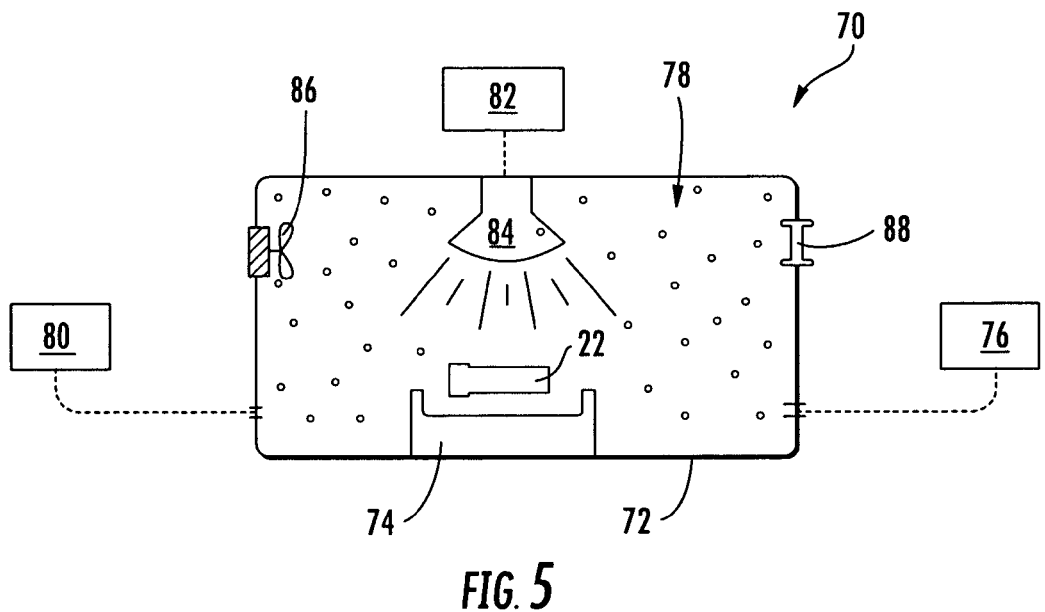
FIG. 5 illustrates a schematic representation of another example method of using a gas for enhancing a bonding capability of the example ferrule of FIG. 1.

Turning now to FIG. 5, an ozone cleaning process 70 is disclosed as yet another example method of using a gas for enhancing the bonding capability of the interior surface 48 of the internal through passage 28. The ozone cleaning process 70 can include loading one or more ferrules 22 into a processing chamber 72 or the like. The ferrules 22 can be supported on a substrate 74, such as a glass or ceramic tray or the like, though an electrically conductive substrate can also be used. In one example, the ferrules 22 can be arranged in a pattern or array on the substrate 74 or the ferrules 22 can be loosely placed upon the substrate 74. It is to be appreciated that where a removable tray is used, the tray may include an optional lid or other element (not shown) configured to inhibit future contamination of the ferrules 22 after the cleaning process 70. In another example, the processing chamber 72 can then be sealed, and a vacuum can be formed therein, such as by a vacuum pump 76 or the like to provide a complete vacuum, a near vacuum, or other pressure-controlled environment, and an additional working gas 78 can be supplied from a gas source 80. In one example, for purposes of the instant ozone cleaning process 70, the working gas 78 can be oxygen. However, the ozone treatment can also be performed at atmospheric pressure and with atmospheric air.

Next, a predetermined amount of energy can be transmitted into the processing chamber 72 for generating the ozone. In one example, a power source 82 can supply power to one or more ultraviolet (UV) light generators 84 for transmitting UV light into the processing chamber 72. The UV light generators 84 can be located inside or outside the processing chamber 72 and can include various lamps capable of transmitting one or more frequencies of UV light, such as mercury lamps or the like. For example, the UV light generators 84 can transmit UV light at the wavelengths of 184.9 nanometers and 253.7 nanometers, though other wavelengths can also be used. Generally, ozone can be created where oxygen is exposed to the 184.9 nanometer wavelength, while the 253.7 nanometer wavelength can facilitate the destruction of the ozone. Thus, use of both wavelengths can provide a generally constant creation and destruction of ozone to encourage the formation of atomic oxygen to clean and enhance the interior surface 48 of the ferrule 22. Therefore, the atomic oxygen can oxidize and remove contaminants on the interior surface 48 and/or perform cross-linking of the interior surface 48 to provide greater bond strength with the adhesive 46.

The ferrules 22 can be subjected to the UV ozone cleaning process 70 for varying amounts of time, such as two minutes, though various other process times can also be used. Additionally, the process can include various other elements to facilitate the cleaning process 70. In one example, the processing chamber 72 can include one or more fans 86 for circulating the ozone within the chamber 72 to facilitate ozone generation and/or destruction, and resulting cleaning of the interior surface 48. In another example, a filter 88 and/or valve can be provided to the processing chamber 72 for controlling the flow of gas and/or contaminants within the processing chamber 72. Moreover, any or all of the steps described herein can be performed in various orders, and can even include more or less steps.

Any or all of the aforedescribed cleaning methods (e.g., plasma-etch, corona discharge, UV ozone treatment) utilize the transmission of a predetermined amount of energy for reaction with a gas to provide mechanical and/or chemical cleaning or enhancement of the interior surface 48 of the ferrule 22. However, it is to be appreciated that any exposed surface of the ferrule 22 will similarly be cleaned. Moreover, any number of the cleaning methods can also be used on the optical fibers 44 for enhancing a bonding strength of the fibers 44 with the adhesive 46. Furthermore, it can be beneficial to pre-clean the ferrule 22 to remove gross contamination before performing one or more of the cleaning methods. The pre-cleaning can remove relatively larger contaminants, such as dirt, dust, or the like, which may not be effectively cleaned by other cleaning methods, and/or which may act as a shield for underlying contaminants. Additionally, it is to be appreciated that various combinations of the described cleaning methods can be performed, as desired.

Turning now to FIGS. 6A-10B, another example method of assembling an optical fiber connector 100 with enhanced bonding capability is provided. For example, as shown in FIGS. 6A-8B, an optical fiber connector 100 can include a ferrule 102 having a first end 104, a second end 106, and an internal through passage 108 extending between the first and second ends 104 and 106. As before, the internal through passage 108 can include one or more passages having various geometries that extend through the ferrule 102 for retaining one or more optical fibers 110. For example, as shown, a plurality of optical fibers 110 can be provided in a ribbon cable arrangement or the like, and can extend a distance outward from the first end 104 of the ferrule 102 once assembled. Though the following description will focus on a ferrule 102 for use with a plurality of optical fibers 110, it is to be appreciated that the ferrule 102 can be configured for use with only a single optical fiber.

As before, the internal through passage 108 can extend through the ferrule 102 and can include one or more optical fiber bores 112 that open through the first end 104 of the ferrule 102. In addition or alternatively, the internal through passage 108 can also include an internal cavity 114 that opens through the second end 106 of the ferrule 102. Thus, the plurality of optical fiber bores 112 can be in fluid communication with the internal cavity 114 such that one or more optical fibers 110 can extend through the internal cavity 114 and into the optical fiber bores 112. It is to be appreciated that the internal through passage 108 can have various geometries and/or sizes along its length, such as a relatively larger cross-sectional dimension proximate the second end 106, and a relatively smaller cross-sectional dimension proximate optical fiber bores 112. In addition or alternatively, the internal cavity 114 (or even an additional portion of the internal through passage 108) can include one or more intermediate portions having tapered transition portions 116 or the like to facilitate manufacture of the ferrule 102, and/or can facilitate insertion of an optical fiber 110 through the ferrule 102. The optical fibers 110 can be retained within the ferrule 102 by an adhesive 111 or the like (see FIG. 7A). As before, the adhesive 111 can generally encapsulate the optical fibers 110 (which could include, e.g., a fiber core, cladding layer, and another protective layer) and is in engagement with an interior surface 113 (see FIG. 7B) of the internal through passage 108.

Figure 6A:
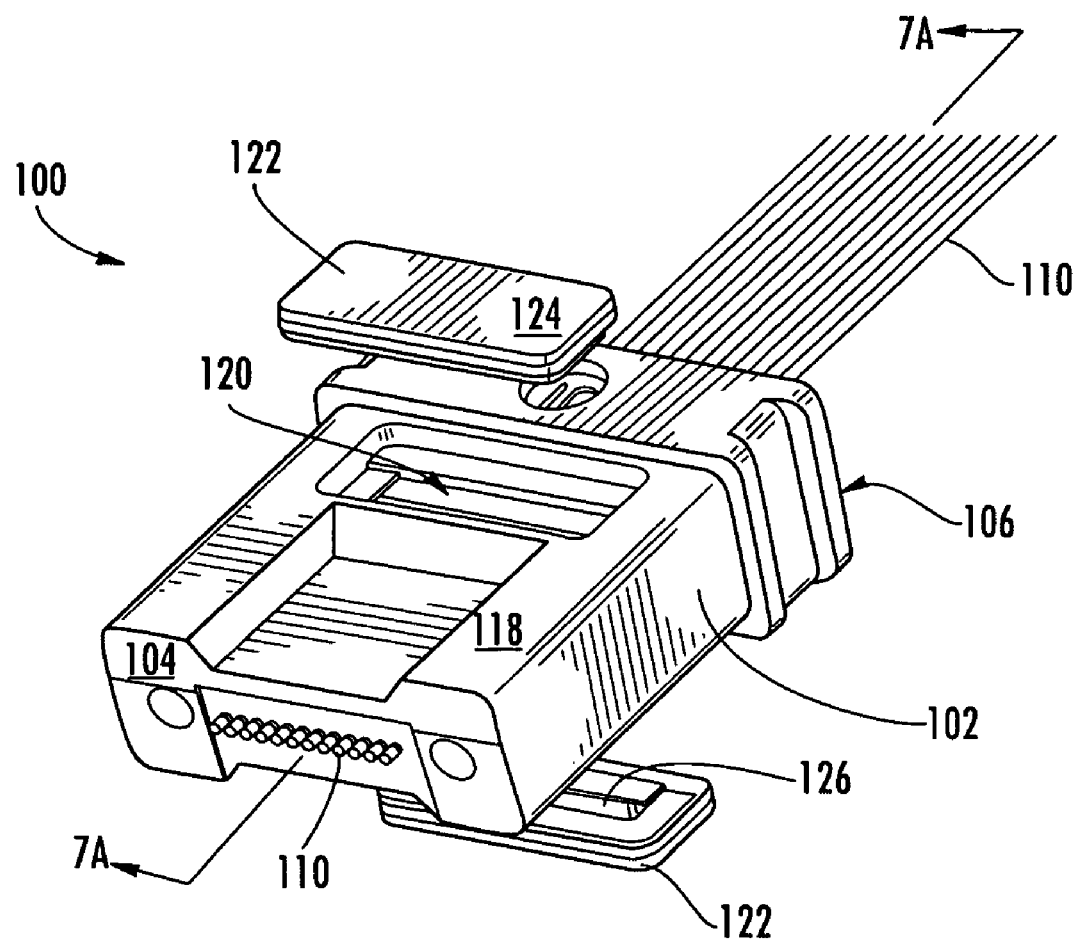
FIG. 6A illustrates a perspective, exploded view of another example multifiber ferrule for use with another example assembly method described herein.
Figure 7A:
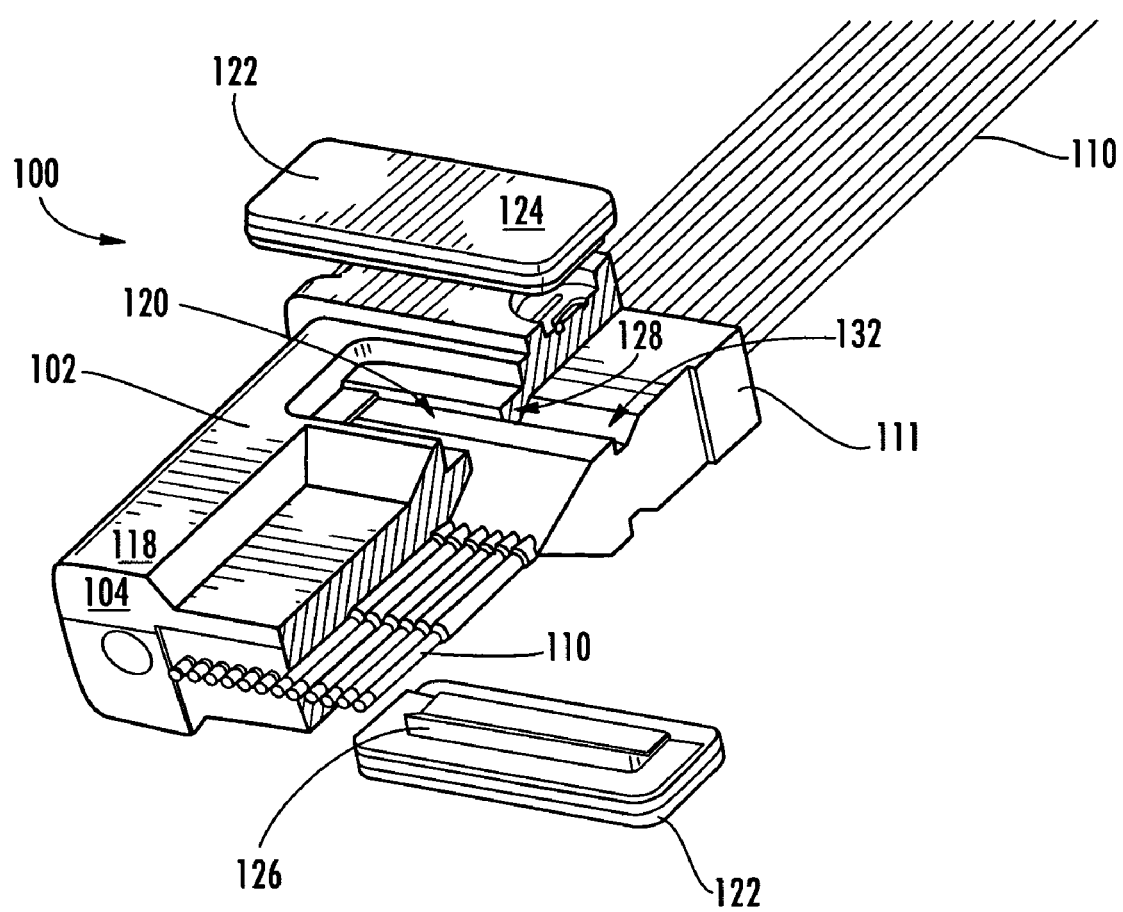
FIG. 7A illustrates a partial cut-away view taken along line 7A-7A of FIG. 6A.
Figure 7B:
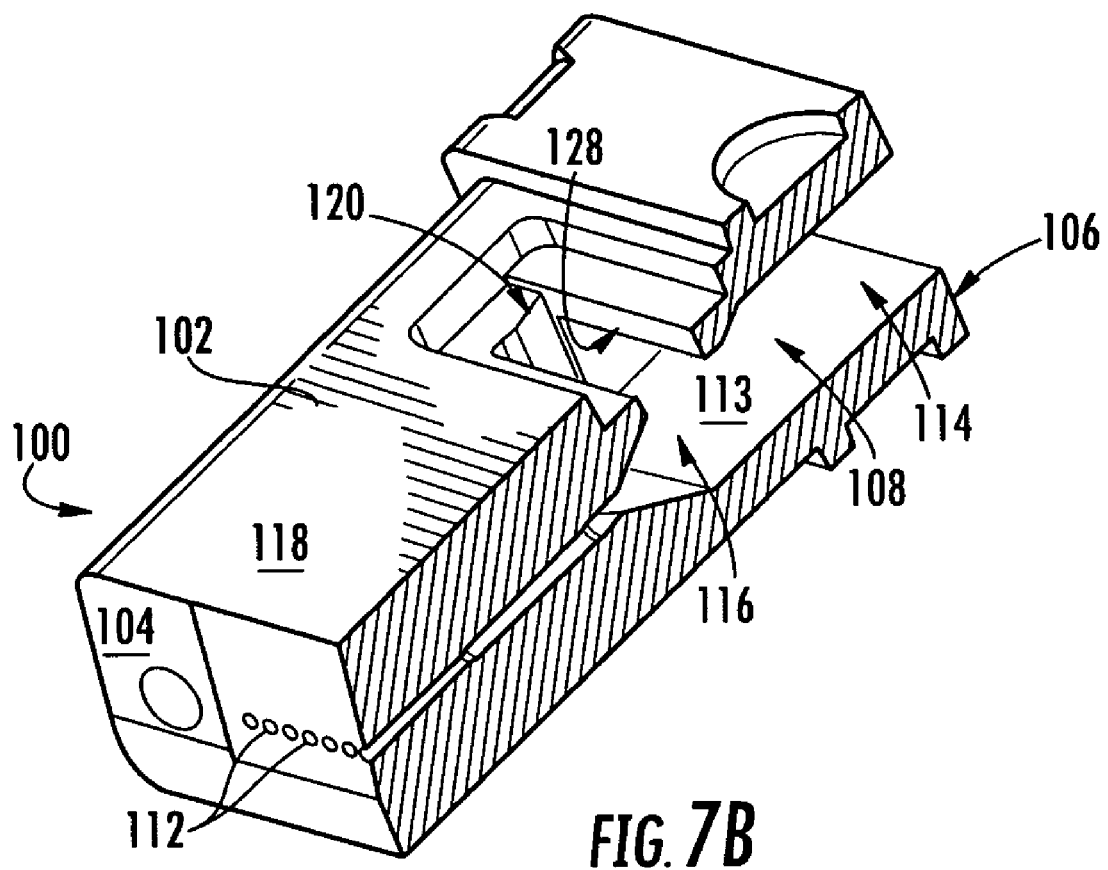
FIG. 7B illustrates the partial cut-away view of the ferrule in FIG. 7A without the inserted fibers, the adhesive and the cap.

Turning specifically to FIG. 7A, a partial cut-away view of an assembled the ferrule 102 is illustrated. While the body of the ferrule 102 has been removed along the line 7A-7A of FIG. 6A, various internal components (e.g., the optical fibers 110, the cured adhesive 111, etc.) have not been removed for clarity. Thus, in addition or as an alternative to the aforedescribed cleaning methods, various structural elements can be provided in order to increase fiber pullout strength of the ferrule 102. It is to be understood that FIGS. 6B and 7B, are similar to FIGS. 6A and 7A, but the optical fibers 110, adhesive 111, and caps 122 have been removed for clarity.

Figure 8A:
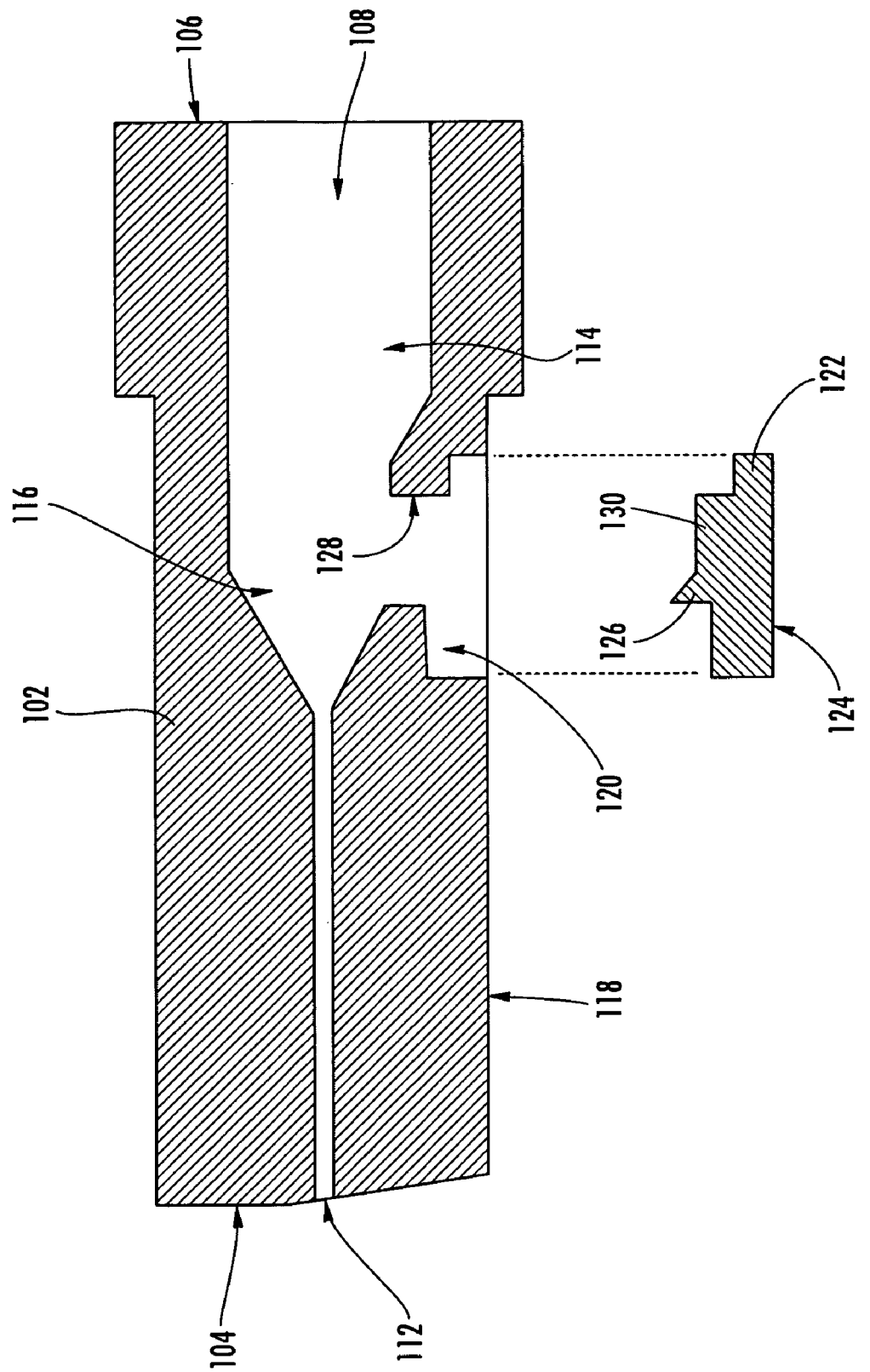
FIG. 8A illustrates a side, sectional exploded view of another example ferrule with a single window and corresponding cap.
Figure 8B:
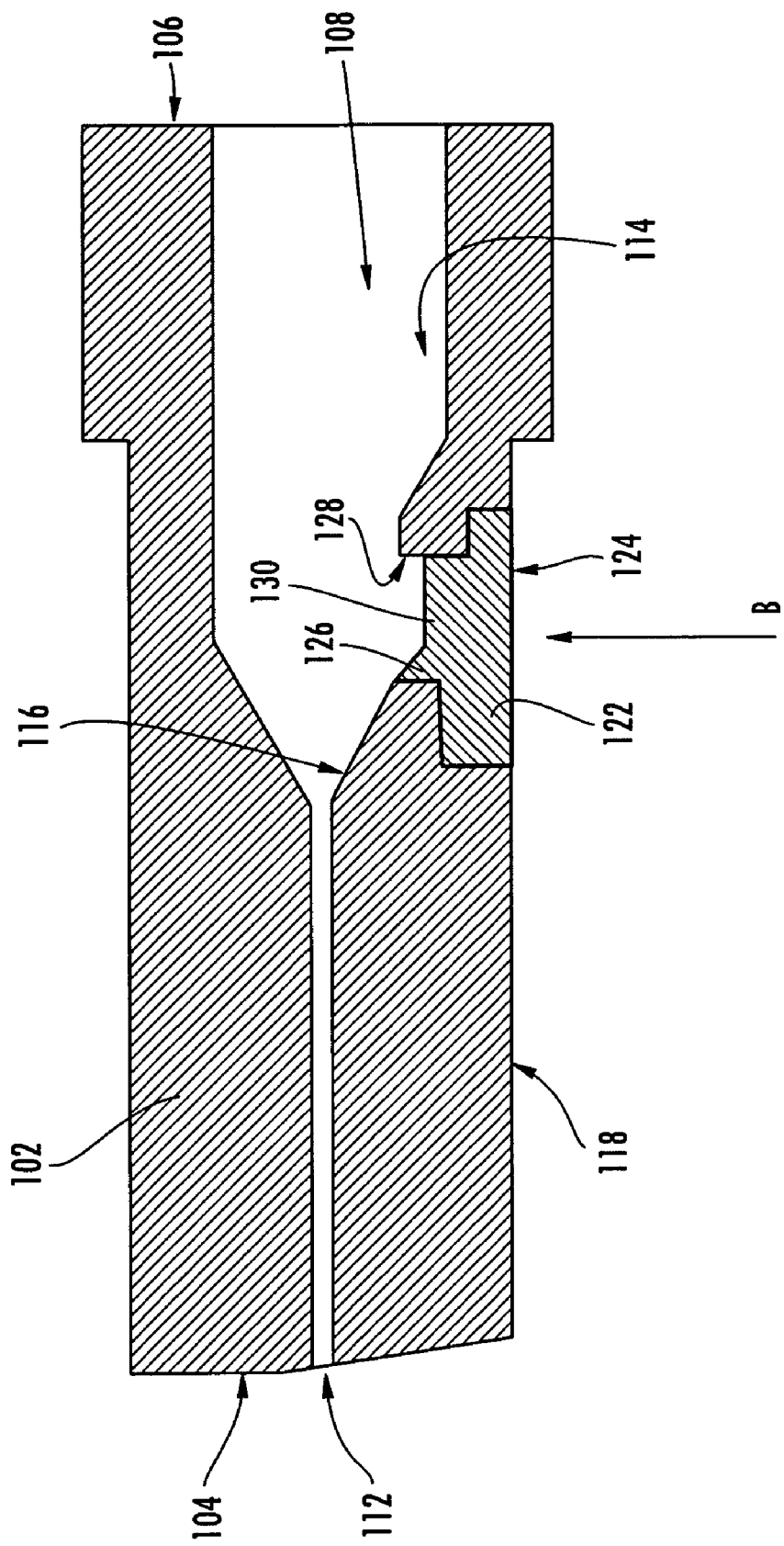
FIG. 8B illustrates the ferrule of FIG. 8A with the cap assembled with the window.

For example, the ferrule 102 can be provided with a side surface 118 and one or more windows 120 that extend through the side surface 118 so as to be in fluid communication with the internal through passage 108. The window 120 can provide access to the internal through passage 108 from outside of the ferrule 102, such as for providing an adhesive or the like. However, providing a window 120 can create a leak path for the adhesive, and/or can create an undesirable surface finish and/or appearance. Thus, the ferrule 102 can further be provided with a cap 122 configured to be inserted at least partially into the window 120. For example, as shown in FIG. 8B, the cap 122 can be inserted into the window 120 along the direction of arrow B. The cap 122 can be at least partially inserted into the window 120 such that a portion of the cap extends within and outside of the window. For example, as shown, the cap 122 can be inserted into the window until the cap 122 is flush with respect to the side surface 118 of the ferrule 102. In other examples (not shown), the cap 122 can be inserted into the window 120 such that the exterior surface 124 is located within the window 120 to provide the ferrule 102 with a recessed area, or the exterior surface 124 can remain outside of the window 120 to provide a projection.

In addition or alternatively, the cap 122 can include various other features. In one example, the cap 122 can include a geometry that corresponds to a mating geometry of the window 120 so as to provide a tight fit therebetween. In one example, the cap 122 can include one or more holes (not shown) to provide access to the internal through passage 108 even when the cap 122 is inserted into the window 120. In another example, the cap 122 can include one or more projections 126 having geometry corresponding to portions of the internal through passage 108, such as the tapered transition portions 116 or the like, to facilitate insertion of the optical fibers 110. Indeed, as shown in FIG. 8B, the projection 126 covers a surface of the window 120 that might otherwise act as an insertion obstruction for an end of an optical fiber being inserted into the through passage 108. The projection 126 of the cap 122 can comprise various configurations. For instance, as shown, the projection 126 can be configured to cover the surface of the window and provide an extension surface that extends the interior surface of the tapered transition portions 116. Projections 126 that extend the interior surface can facilitate insertion of the optical fibers 110. For example, the projections can remove or reduce the severity of insertion obstructions such as the illustrated window surface. In addition or alternatively, the projections can provide an insertion surface that directs the ends of the optical fibers 110 toward the corresponding optical fiber bores 112. For instance, as shown, the projection 126 includes a tapered surface configured to guide the ends of the optical fibers towards the optical fiber bores 112.

As further illustrated, the internal through passage 108 of the ferrule 102 can be provided with a shoulder 128 for engagement with the adhesive 111. In one example, the shoulder 128 can be at least partially defined by the ferrule 102, such as being integrally formed with the ferrule 102. In the shown example, the shoulder 128 can comprise a surface extension of the window 120. Furthermore, the shoulder 128 can include an insertion surface, such as the illustrated tapered surface configured to remove or reduce the severity of insertion obstructions for the end of the optical fibers 110. In addition or alternatively, the shoulder 128 can be at least partially defined by the cap 122, such as by a portion 130 of the projection 126 that is located adjacent to and/or cooperates with the shoulder 128. In yet another example (not shown), the shoulder 128 can be a separate element coupled to the ferrule 102. Moreover, at least a portion of the shoulder 128 can be oriented generally transverse to a longitudinal axis of the ferrule 102.

As a result, engagement of the cured adhesive 111 with the shoulder 128 can provide an increased shearing force and correspondingly increased pullout strength. For example, as shown in FIG. 7, the shoulder 128 can create a corresponding depression 132 within the cured adhesive 111 for providing the increased shearing force. At the same time, the shoulder 128 can include the illustrated tapered surface or other insertion surface to facilitate guiding of the ends of the optical fibers 110 prior to curing of the adhesive 111. It is to be appreciated that the pullout strength can be adjusted based upon the actual geometries of one or a combination of the geometries of the internal through passage 108, cap 122, shoulder 128, and any projections 126, and/or even the relative orientations thereof.

The adhesive 111 can be introduced into the ferrule 102 in various manners, such as through the optical fiber bores 112, internal cavity 114, and/or window 120. Moreover, the adhesive, 111 can be introduced into the ferrule 102 prior to, concurrent with, or subsequent to the insertion of the cap 122 in the window 120, desirably in fluid state. Similarly, the optical fibers 110 can be inserted into the ferrule 102 prior to, concurrent with, or subsequent to the introduction of the adhesive 111 (desirably in fluid state) and/or cap 122 in the ferrule 102. In the shown example of FIG. 7, the optical fibers 110 can be inserted into the ferrule 102 by way of the second end 106 after the adhesive 111 (desirably in fluid state) is introduced into the internal through passage 108. Thus, upon curing of the adhesive, the optical fibers 110 are secured with respect to the internal through passage 108 by the adhesive 111 with an interaction between the adhesive 111 and the shoulder 128 that provides an axial stop in a direction from the first end 104 to the second end 106 while the portion of the cap 122 is inserted into the window 120. Still, the geometries of the various elements can also be modified to provide an axial stop in various other directions, angles, etc. As a result, use of the cap 122 during the assembly process can provide the advantages of a windowless ferrule design along with the advantages of a windowed ferrule to provide a desired pullout strength, if the window is not desired during assembly.

Figure 9A:
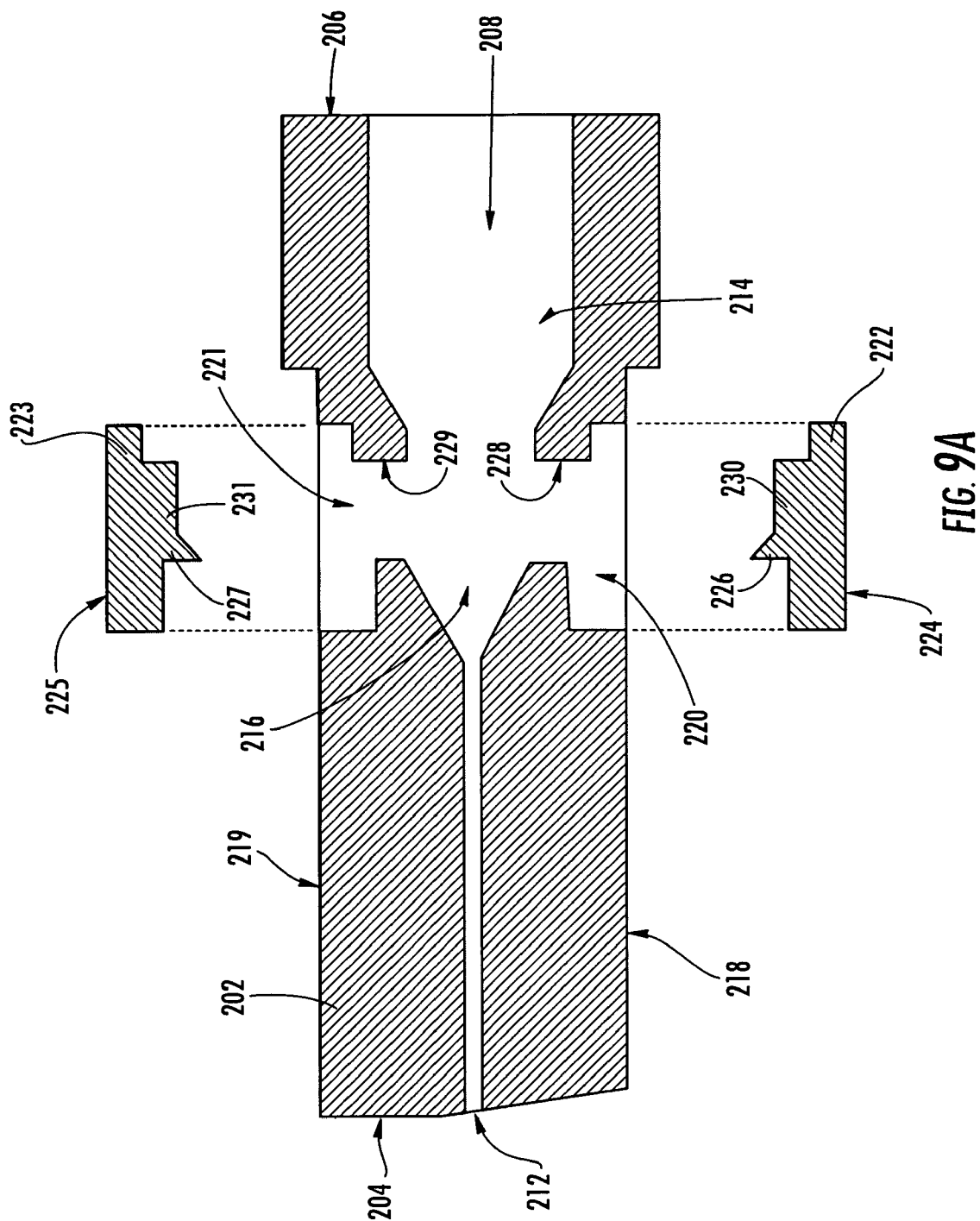
FIG. 9A illustrates a side, sectional exploded view of another example ferrule with multiple windows and corresponding caps.
Figure 9B:
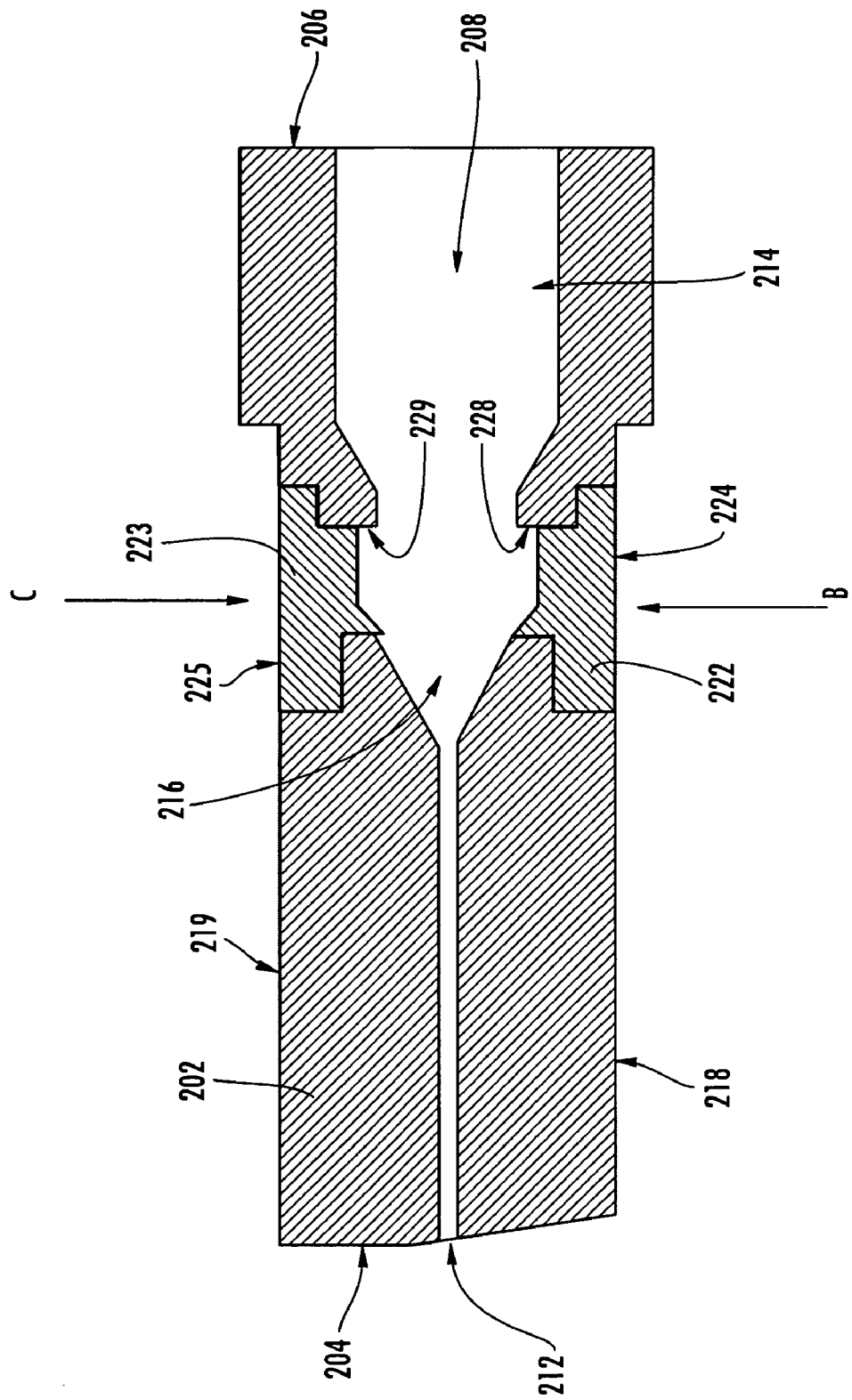
FIG. 9B illustrates the ferrule of FIG. 9A with the caps assembled with the respective windows.

Turning now to FIGS. 9A-9B, as stated previously herein, one general disadvantage of a windowed ferrule is that the ferrule is no longer symmetrical, and extra care must be taken to properly orient the ferrule during manufacturing, such as during an automated assembly process. Therefore, a plurality of windows can be provided to the ferrule to make the ferrule more symmetrical. It is to be appreciated that the two-hundred series reference numbers are utilized in FIGS. 9A-9B to refer to similar components of FIGS. 8A-8B. However, more or less components can be provided and arranged similarly or even differently. Moreover, though no adhesive is illustrated, it is to be appreciated that the adhesive can be similar to that shown and described in FIGS. 3 and 6-7.

As shown, the ferrule 202 can be provided with a second side surface 219 and a second window 221 that extends through the second side surface 219 and is in fluid communication with the internal through passage 208. Additionally, a second cap 223 can be provided and inserted at least partially into the second window 221.

The second cap 223 can be inserted into the second window 221 along the direction of arrow C such that an exterior surface 225 of the second cap 223 is generally flush with the second side surface 219 of the ferrule 202. In other examples (not shown), the second cap 223 can be inserted into the second window 221 such that the exterior surface 225 provides the ferrule 202 with a recessed area or a projection.

Moreover, the ferrule 202 can also be provided with a second shoulder 229 due to the addition of a second window 221 for engagement with the adhesive 111 (see FIG. 7). As before, the second shoulder 228 can be at least partially defined by (e.g., integrally formed with) the ferrule 202, though it can also be at least partially defined by the second cap 223, or it can even be a separate element coupled to the ferrule 202. Further, the adhesive 111 can be provided to the internal through passage 208 of the ferrule 202 by any or all of the internal cavity 214, optical fiber bores 212, first window 220 and the second window 221. Therefore, providing the ferrule 202 with a second window 221 and a second cap 223 can facilitate the manufacturing process. In addition or alternatively, providing the ferrule 202 with the second shoulder 229 can provide an increased shear force and pullout strength.

Figure 10A:
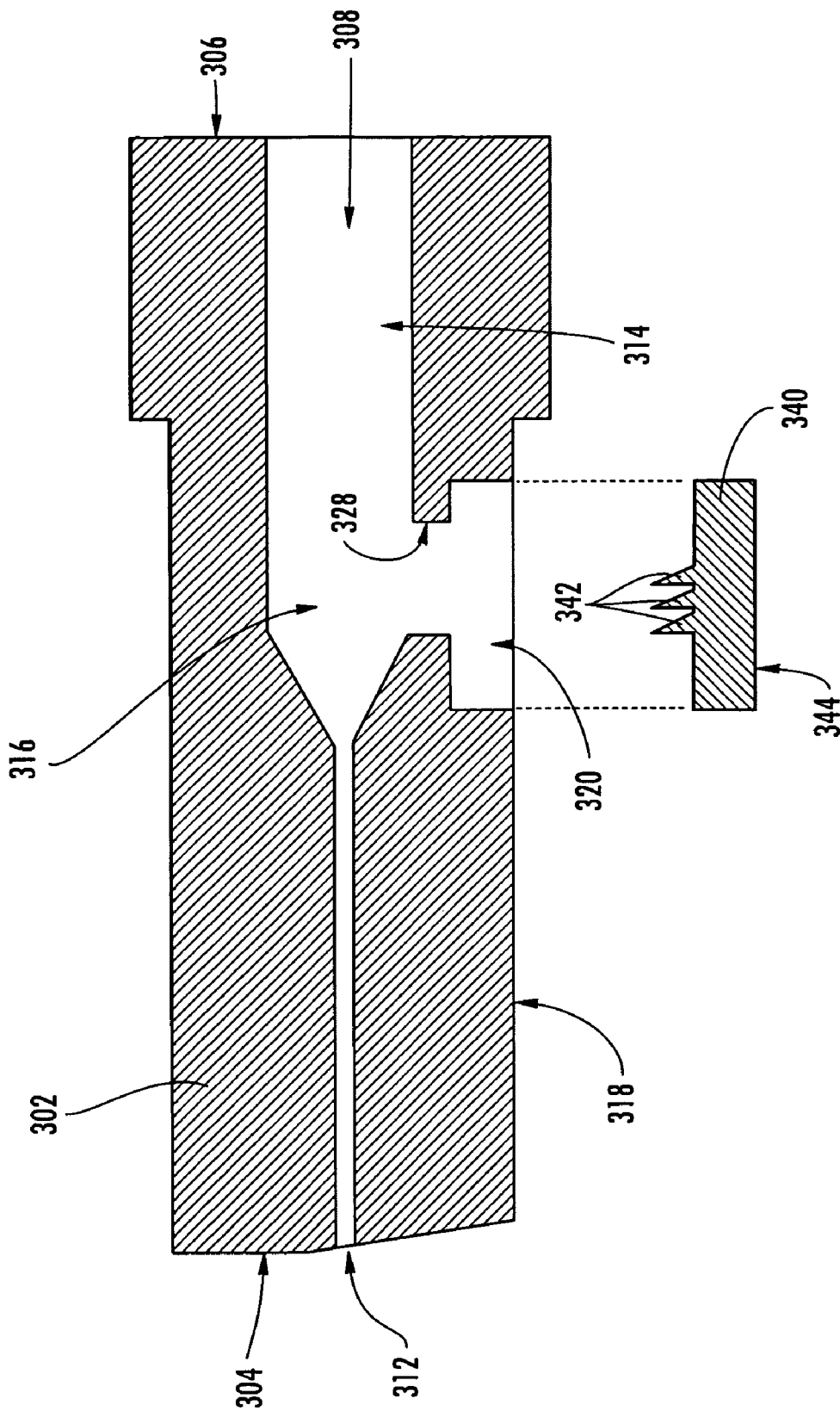
FIG. 10A illustrates a side, sectional exploded view of another example ferrule with a single window and corresponding cap.
Figure 10B:
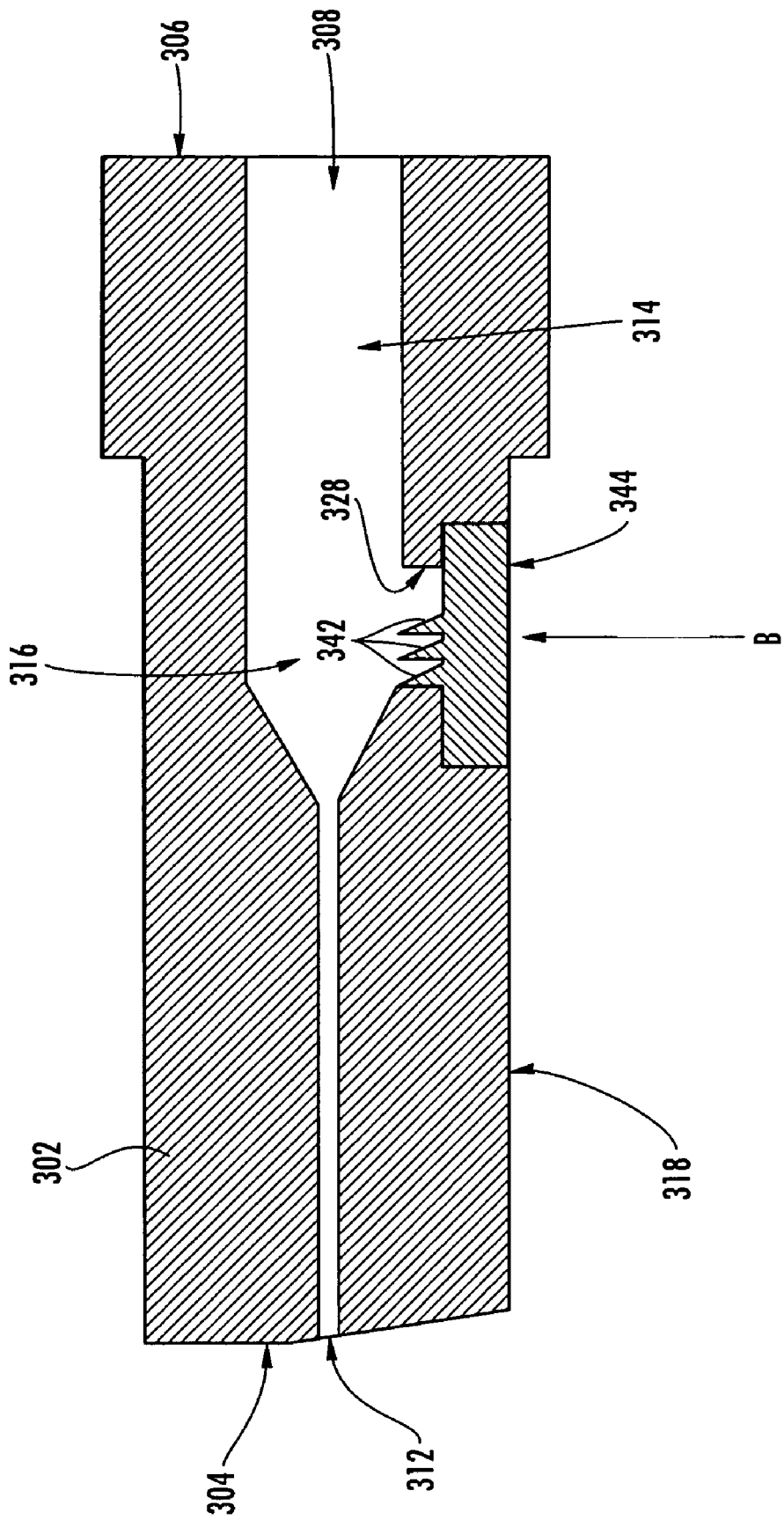
FIG. 10B illustrates the ferrule of FIG. 10A with the cap assembled with the window.

Turning now to FIGS. 10A-10B, as stated previously herein, the shoulder can be at least partially defined by the cap inserted into the window. Therefore, the cap can include structure for engagement with the adhesive that can increase the shearing force. It is to be appreciated that the three-hundred series reference numbers are utilized in FIGS. 10A-10B to refer to similar components of FIGS. 8A-8B. However, more or less components can be provided and arranged similarly or even differently. Moreover, though no adhesive is illustrated, it is to be appreciated that the adhesive can be similar to that shown and described in FIGS. 3 and 6-7.

The ferrule 302 can be provided with a window 320 extending through a side surface 318, as before, and a cap 340 can be configured to be at least partially received within the window 320. The cap 340 can have a geometry corresponding to the window 320 and can include an exterior surface 344 that can be below, flush with, or above the side surface 318 of the ferrule 302 when the cap 340 is received within the window 320. The cap 340 can further include at least one shoulder 342 extending therefrom and towards the internal through passage 308. In the shown example, the cap 340 includes a plurality of shoulders 342 extending a distance into the internal through passage 308 for engagement with the adhesive 111 contained therein when the ferrule 302 is assembled. Thus, once the adhesive 111 cures, each of the shoulders 342 can provide a shearing force for increasing the pullout strength of the ferrule 302.

Moreover, variable numbers of shoulders 342 can include various geometries. For example, as shown, the shoulders 342 can have a generally tapered geometry having a relatively larger cross-sectional area adjacent the cap 340 to increase the shear strength, and a relatively smaller cross-sectional area adjacent the internal through passage 308 to facilitate engagement with the adhesive 111. Still, various numbers of shoulders 342 can be arranged variously and/or have various other geometries. In addition or alternatively, as before, the ferrule 302 can also define a shoulder 328 for engagement with the cured adhesive 111 to provide increased pullout strength. Further, though shown with only a single window 320, it is to be appreciated that the ferrule 302 can also be provided with a plurality of windows, ferrule shoulders, and/or a plurality of caps that can include various shoulders 342 forming additional shoulders, etc.

It is to be appreciated that any or all of the cleaning methods described herein (e.g., plasma-etch cleaning, corona discharge, UV ozone treatment) can be performed in cooperation with any or all of the mechanical strength enhancements (e.g., providing windows, caps, shoulders, etc.) to provide a desired bonding capability of the optical fibers for a particular application.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A method of assembling an optical fiber connector utilizing an adhesive, the method comprising:
providing a ferrule comprising a first end, a second end, and an internal through passage extending between the first end and the second end;
conditioning a surface of the internal through passage using a plasma to alter a surface activation energy of the surface, wherein the altered surface activation energy of the surface is approximately equal to a surface activation energy of the adhesive;
introducing the adhesive into a conditioned portion of the internal through passage; and
inserting at least one optical fiber through the internal through passage following introduction of the adhesive into the conditioned portion of the internal through passage, wherein the at least one optical fiber is secured to the surface of the internal through passage by the adhesive.

2. The method of claim 1, wherein the plasma is an oxygen plasma.

3. The method of claim 1, wherein the adhesive includes an epoxy.

4. The method of claim 1, wherein the internal through passage includes at least one optical fiber bore that opens through the first end and an internal cavity that opens through the second end, wherein the fiber bore is in fluid communication with the internal cavity.

5. The method of claim 4, wherein the at least one fiber bore includes a plurality of optical fiber bores in fluid communication with the internal cavity, and wherein the method further includes the step of inserting each of the plurality of optical fibers through the internal cavity and into a respective one of the plurality of optical fiber bores.

6. The method of claim 1, wherein the plasma is created by a corona discharge process.

7. A method of assembling an optical fiber connector utilizing an adhesive, the method comprising:
providing a ferrule comprising a first end, a second end, and an internal through passage with at least one optical fiber bore that opens through the first end and an internal cavity that opens through the second end, wherein the at least one fiber bore is in fluid communication with the internal cavity;
conditioning a surface defining the internal through passage to alter a surface activation energy of the surface, wherein the altered surface activation energy of the surface is approximately equal to a surface activation energy of the adhesive;
introducing the adhesive into a conditioned portion of the internal through passage; and
inserting at least one optical fiber through the internal cavity and into the at least one optical fiber bore following introduction of the adhesive into the conditioned portion of the internal through passage, wherein the at least one optical fiber is secured to the surface of the internal through passage by the adhesive.

8. The method of claim 7, further including the step of generating plasma within the processing chamber.

9. The method of claim 7, wherein the plasma is an oxygen plasma.

10. The method of claim 7, wherein the plasma is created by a corona discharge process.

11. The method of claim 7, wherein the adhesive includes an epoxy.

* * * * *